(12) United States Patent
Shirabe (10) Patent No.: US 11,216,599 B2
(45) Date of Patent: Jan. 4, 2022

(54) METHOD, APPARATUS AND COMPUTER PROGRAM FOR DESIGNING A CORRIDOR

(71) Applicant: Takeshi Shirabe, Solna (SE)

(72) Inventor: Takeshi Shirabe, Solna (SE)

( * ) Notice: Subject to any disclaimer, the term of this patent is extended or adjusted under 35 U.S.C. 154(b) by 910 days.

(21) Appl. No.: 15/359,701

(22) Filed: Nov. 23, 2016

(65) Prior Publication Data

US 2017/0147716 A1    May 25, 2017

(30) Foreign Application Priority Data

Nov. 24, 2015 (SE) .................... 1500487-2

(51) Int. Cl.
*G06F 30/13* (2020.01)
*G06F 113/14* (2020.01)

(52) U.S. Cl.
CPC .......... *G06F 30/13* (2020.01); *G06F 2113/14* (2020.01)

(58) Field of Classification Search
CPC .... G06Q 10/063; G06Q 50/165; G06F 30/13; G06F 2113/14

USPC ....................................... 703/1, 2
See application file for complete search history.

(56) References Cited

PUBLICATIONS

Alexandre B. Gonçalves, "An Extension of GIS-based Least-cost Path Modelling to the Location of Wide Paths", International Journal of Geographical Information Science, Downloaded Feb. 19, 2015.
Dennis L. Huber et al., "Transmission Corridor Location Modeling", Journal of Transportation Engineering, vol. 111, Issue 2, Mar. 1985, pp. 114-130.

*Primary Examiner* — Juan C Ochoa
(74) *Attorney, Agent, or Firm* — Patent Portfolio Builders PLLC (57) ABSTRACT

A corridor in a target area is designed so as to minimize an environmental, economic, behavioral or any other cost caused by implementing the corridor in a grid of cells. Translation costs caused by straight-line translations of an optimized arrangement of cells through the grid are calculated using locations and values of the swept cells. The optimized arrangement is characterized by a reduced variation of translation width with a translation direction.

18 Claims, 6 Drawing Sheets

METHOD, APPARATUS AND COMPUTER PROGRAM FOR DESIGNING A CORRIDOR

CROSS-REFERENCE TO RELATED APPLICATIONS

The present application is related to and claims the benefit of priority of Swedish Patent Application No. 1500487-2 filed on Nov. 24, 2015, in the Swedish Patent and Registration Office, the entire contents of which is incorporated herein by reference.

BACKGROUND

Technical Field

Embodiments of the subject matter disclosed herein generally relate to designing a corridor for conserving a wildlife habitat or building a road or a pipeline in a target area so as to minimize the environmental, economic, behavioral or any other cost. The corridor may be obtained by translating an optimized arrangement of cells through a grid of cells having different values corresponding to the cost impact caused by including them in the corridor.

Discussion of the Background

Geographic information systems (GISs), computer-aided design (CAD) systems, raster graphic editors, and image processors, etc., are configured to store, process and/or present raster data. Designing and building highways, power lines and pipelines, etc., often require defining/selecting a path through the target area so as to minimize the environmental cost. Seeking such a path between two terminuses (start and end) over a cost surface is referred to as the "least-cost path problem." in a raster representation, a continuous cost surface may be discretized into a grid of cells, with each cell having an associated value, and the path being a sequence of cells. Conventional computer systems are able to solve the least-cost path problem when the path is one cell wide. However, when a corridor wider than one cell is sought, the least cost corridor problem becomes much more complicated. The search for a least-cost corridor with a specified width greater than one cell, between two terminuses, is known as the "least-cost corridor problem."

At first glance, the least-cost corridor problem seems a trivial variation of the least-cost path problem. One naive approach is to create a buffer around a path obtained as a solution of the least-cost path problem with half the corridor width on each side of the path. However, the corridor built as a buffer around the least-cost path may include very expensive cells which would make this corridor no longer achieve the least-cost objective.

Another approach is to resample the grid so that the cell size is equal to the corridor width and to seek a least-cost path in the re-sampled grid. However, tests showed that the least-cost path in the re-sampled grid did not necessarily yield the least cost in the original grid.

Another known approach is to smooth the cost grid by assigning to each cell the sum or mean of the values of all cells within half the corridor width from that cell. The least-cost path in the smoothed cost grid meets the least-cost objective if the cost grid has about the same value in most of the cells except for some outliers (e.g., representing obstructions), which have prohibitively high values. However, in general, the least-cost path found using the smoothed cost does not necessarily match the centerline of the actual least-cost corridor, because the path, overemphasizes the original values of some cells more than others. This approach works well only if the path/corridor happens to extend in a single, orthogonal or diagonal direction.

Yet another known approach transforms the grid of cells into a graph in which each vertex represents a cell and edges (weighted and directed) connect pairs of vertices. A sequence of edges between two terminus vertices in the graph (e.g., an "origin" and a "destination") for which the sum of the weights of edges there-between is lowest can be found using methods such as Dijkstra's algorithm. The weight of an edge is calculated by placing a rectangle with a width equal to the required corridor width between the centers of the corresponding cells, and adding values corresponding to fractions of the cells covered by the rectangle. A sequence of such rectangles forms the corridor. However, the sum of the weights of the corresponding edges deviates from the cost of the corridor because these rectangles have overlaps and/or gaps between them (unless they happen to align in a single, orthogonal or diagonal direction). This deviation grows as the rectangles become wider.

The ArcGIS® geographic information system (developed by Environmental Systems Research Institute, ERSI) has a CorridorDesigner extension, which takes another approach to finding a least-cost corridor bundling multiple (not necessarily least cost) paths. If the paths are such that their costs are less than a certain threshold, their union can be found by assigning the sum of the least cost from each terminus to each cell, and selecting all cells whose total costs are less than the threshold. Bundled paths may form a corridor-like feature, but with variable widths. More significantly, although the width of the corridor-like feature tends to increase with the threshold, it does not do so in a systematic or predictable manner. Furthermore, it is not known if the corridor-like feature obtained using this approach has the least cost or just a low cost (lower than a threshold).

In yet another approach, a corridor is considered as a sequence of "path fronts," each of which is a sequence of cells. In a graph in which vertices represent valid path fronts, and edges represent permissible transitions from one path front to another, a shortest path algorithm yields a path, which is expected to correspond to a least-cost corridor. This approach is effective only if the path fronts are relatively short. The computational time for this approach increases with the number of nodes, which grows exponentially with path-front length. Furthermore, a corridor determined as a sequence of path fronts may have a constant width in terms of numbers of cells, but not in terms of (Euclidean) distance.

As outlined in this section, no conventional approach or method for finding a least-cost corridor provides the desirable efficiency and accuracy. Thus, there is a need to develop new methods for designing a corridor in a manner that mitigates the above-identified drawbacks.

SUMMARY OF THE INVENTIONS

According to an embodiment, there is a method for designing a corridor for conserving a wildlife habitat or building a road or a pipeline in a target area so as to minimize an environmental, economic, behavioral or any other cost caused by implementing the corridor. The method includes obtaining a grid of cells representing the target area, with each cell having associated a value corresponding to a cost impact triggered by including the cell in the corridor. The method further includes calculating translation costs caused by straight-line translations of an optimized arrangement of cells through the grid. Each of the translation costs is determined using locations and values of cells swept during a respective one of the straight-line translation. The optimized arrangement is characterized by a reduced variation of translation width with a translation direction. The method further includes designing the corridor as a subset of the straight-line translations sequenced to connect a start zone of cells in the grid to an end zone of cells in the grid, so as to have a lowest sum of translation costs for the subset, wherein the corridor is a reunion of cells swept along translations in the subset.

According to another embodiment there is an apparatus for designing corridor for conserving a wildlife habitat or building a road or a pipeline in a target area so as to trigger a minimal environmental, economic, behavioral or any other cost. The apparatus includes an interface configured to exchange data and/or commands related to the designing of the corridor, one or more processors and a display configured to display at least a part of the grid of cells including the designed corridor, and/or to display information characterizing the corridor. The one or more processors are configured

- to obtain a grid of cells representing the target area, with each cell having associated a value corresponding to a cost impact triggered by including the cell in the corridor,
- to calculate translation costs caused by straight-line translations of an optimized arrangement of cells through the grid, wherein each of the translation costs is determined using locations and values of cells swept during a respective one of the straight-line translation, and the optimized arrangement is characterized by a reduced variation of translation width with a translation direction, and
- to design the corridor as a subset of the straight-line translations sequenced to connect a start zone of cells in the grid to an end zone of cells in the grid, so as to have a lowest sum of translation costs for the subset, wherein the corridor is a reunion of cells swept along translations in the subset.

According to yet another embodiment, there is a non-transitory computer-readable recording medium storing executable codes which, when executed by a computer, make the computer perform a method for designing a corridor for conserving a wildlife habitat or building a road or a pipeline in a target area so as to minimize an environmental, economic, behavioral or any other cost caused by implementing the corridor.

BRIEF DESCRIPTION OF THE DRAWINGS

The accompanying drawings, which are incorporated in and constitute a part of the specification, illustrate one or more embodiments and, together with the description explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject, matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The embodiments described in this section enable designing a corridor for conserving a wildlife habitat or building a road or a pipeline in a target area so as minimize an environmental, economic, behavioral or any other cost caused by implementing the corridor. The target area is represented by a grid of cells, with each cell having an associated value corresponding to a cost impact triggered by including that cell in the corridor. In order to minimize the cost, the corridor is designed using an optimized arrangement of cells translated through the grid. The optimized arrangement is such as to substantially reduce variation of corridors width with a translation direction. Due to this optimization, the corridors inclusion of cells causing undesirable widths is minimized.

Figure 1:
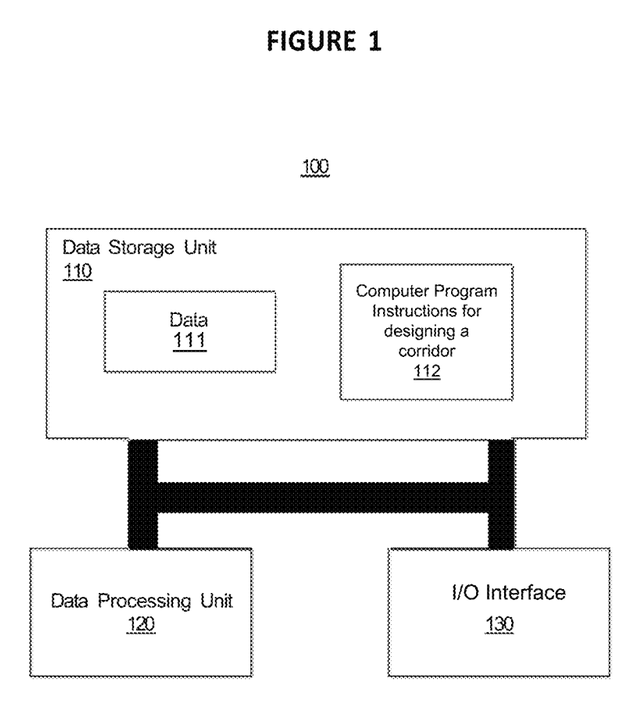
FIG. 1 is a computer-type apparatus according to an embodiment.

The corridor may be designed using a computer-type apparatus 100, as exemplarily illustrated in FIG. 1. The apparatus 100 includes data storage unit 110, data processing unit 120, and input/output (IO) interface 130. Data storage unit 110 may be a memory configured to non-transitorily store data 111 and computer-executable instructions 112. Data processing unit 120 includes one or more processors configured to create, modify, update and/or retrieve the data 111. Data processing unit 120 is configured to execute computer program instructions 112. IO interface 130 is configured to receive input from a user, to display the data to the user, and to supply data to data processing unit 120. Data storage unit 110 may include one or more computer-readable media, such as hard disks, optical discs and random access memories. The IO interface 130 may include one or more IO devices such as a keyboard, a mouse, stylus pen, a display and a touchscreen etc.

<The Grid>

Figure 2:
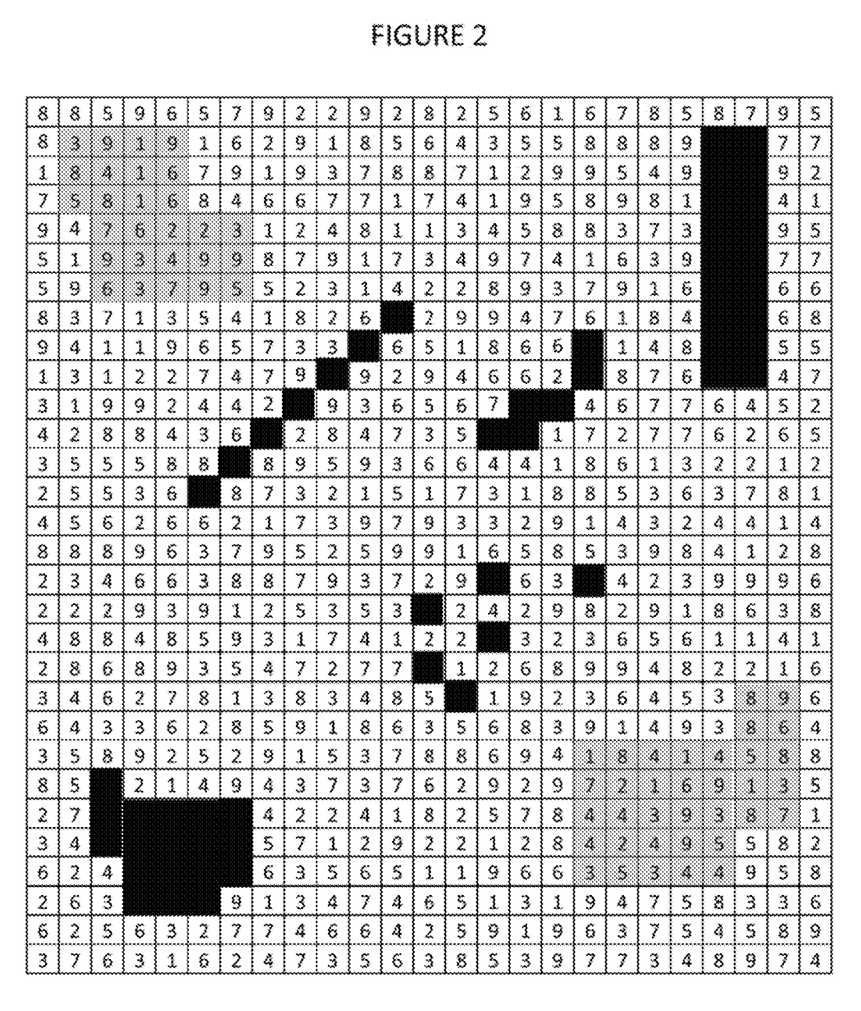
FIG. 2 illustrates a rectangular grid with, values associated to the grid cells.

FIG. 2 illustrates a grid with square cells. However, the square shape of the cells is merely illustrative and not intended to be limiting (e.g., the cells may also be hexagonal, or may have different shapes and sizes). The grid and the cells may also be three-dimensional. For example, the corridor may be designed to accommodate an underground oil pipeline, and the least-cost corridor is designed to minimize potential environmental damage in case of accidental leaks. The cell values may be determined by their depth, soil composition, proximity to phreatic or table water, etc.

The numbers in the cells of FIG. 2 are the cell values. The grid includes some cells with no values therein, i.e., "forbidden areas"; alternatively, these cells may have significantly larger values (e.g., 1,000,000 when the other cells are in a 1-10 range) making the forbidden-area cells undesirable for a low-cost corridor. The cell value quantifies a characteristic referred to herein as "cost." This characteristic may actually correspond to travel time, energy loss, environmental risk, intensity of light or radiation, tree density, etc. The cell value is generally a positive number, but not necessarily an integer (the values in FIG. 2 are merely illustrative and not intended to be limiting in terms of format or range).

A cartographic map is easily associated with a grid, with each pixel being a cell. Cartographic maps typically represent an area's attributes using colors or gray shades, which can easily be converted into values.

The grid may be derived from one or more data sets each may be encoded in one of data structures or formats that can be stored and processed using computers. Some data sets may be encoded in a proprietary raster format such as ARC/INFO® GRID (from ESRI), and some other data sets may be encoded in image formats such as TIFF, GIF or JPEG, etc.

<Definition of Neighborhood>

Figure 3:
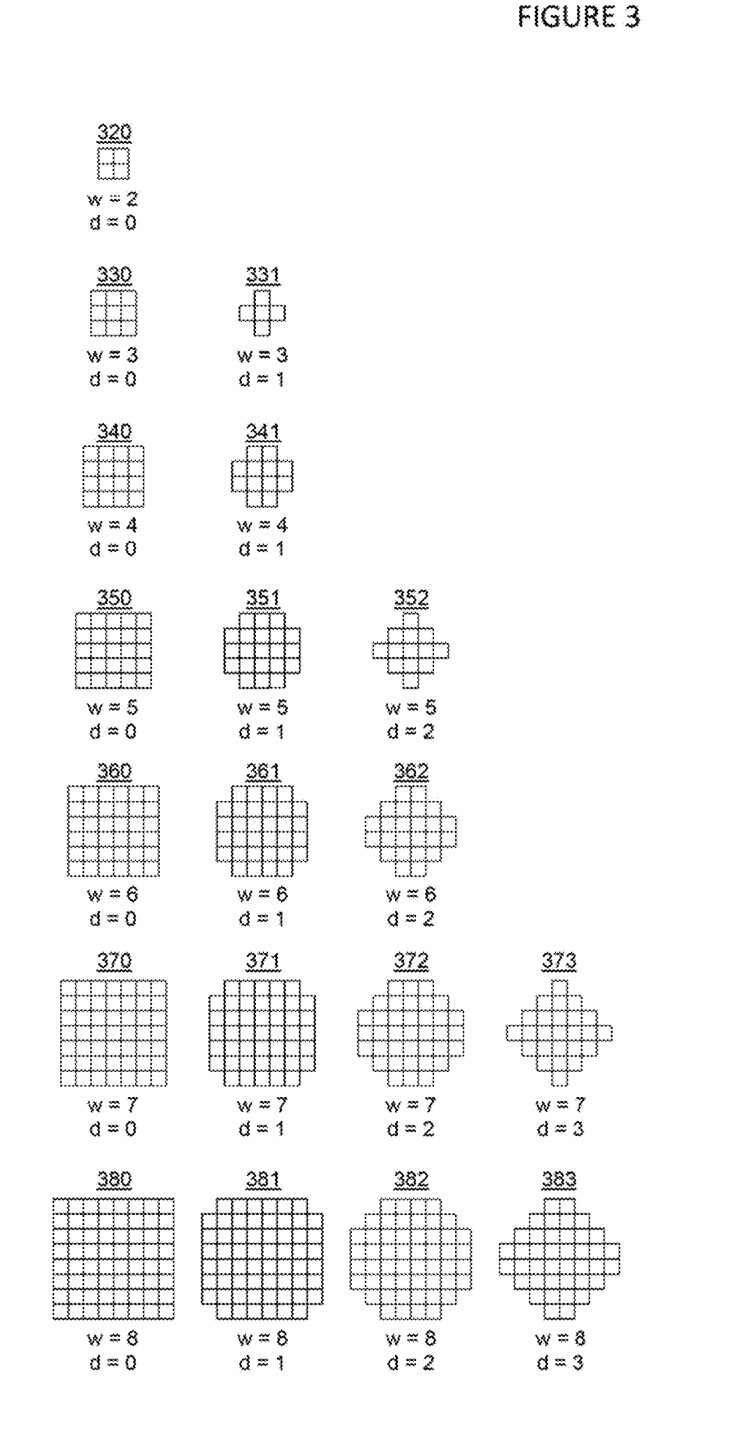
FIG. 3 is a set of cell arrangements.

A neighborhood is a set of adjacent cells (i.e., two or more cell FIG. 3 illustrates neighborhoods having optimized arrangements. All neighborhood cells are connected and arranged such as to reduce corridor's width variation with the translation direction (the width being evaluated perpendicular to the translation direction). In case of square cells, an arrangement that has a same number of rows and columns, w, would yield same width when translated vertically or horizontally. Neighborhood 320 in FIG. 3 has w=2 rows and columns, neighborhoods 330 and 331 have w=3 rows and columns, neighborhoods 340 and 341 have w=4 rows and columns, etc. When neighborhoods 330 and 340 are translated diagonally, the width is $\sqrt{2}$ times the width of horizontal and vertical translations.

In order to reduce width variation when the neighborhoods are translated diagonally, the optimized arrangements have cells removed diagonally starting from the corners of the square cell arrangements. If no cells are removed the depth of removal is d=0. If only the corner cells are removed, the depth of removal is 1. As the depth of removal increases, neighborhood cells adjacent to the previously removed cells are removed. In FIG. 3, the neighborhoods are labeled "3wd". For example, neighborhood 331 has w=3 rows and columns and d=1, so only the corner cells are removed. In another example, neighborhood 362 has w=6 rows and columns (similar to neighborhoods 360 and 361), and since d=2, the corner cells and a diagonal row made of the cells adjacent to the corner cells have been removed for all four corners. The depth of removal is limited so that 2d<w (otherwise the number of rows and columns of the resulting arrangement would become lower than the initial number).

Neighborhoods with removed cells are known as "(w, d)-forms." If d is not zero, the (w,d) form approximates an eight-side shape. The (w,d) forms orthogonal diameter is w long, its diagonal diameter is (w−d−1) or (w−d) long, its side along a row or column is (w−2d) long, and its diagonal sides are (d+1) long, in terms of number of cell sides. The width difference between translating orthogonally (i.e., vertically or horizontally) and diagonally a neighborhood having an optimized arrangement with removed diagonal cells is smaller than when no cells are removed.

A (w, d)-form is referred to as a "(w)-form" when the w and d satisfy the following formula.

$$\sqrt{2}(w-d-1) < w < \sqrt{2}(w-d). \quad (1)$$

It approximates a regular octagon with h a diameter w, having a minimal difference between its orthogonal and diagonal diameters and thus translation width.

If the grid is three-dimensional (3D) with cubic cells, similar 3D forms may be defined. A 3D (w, d) form is a w-by-w-by-w block of cells with cells removed from each edge for a depth d, where w and d are integers such that 0≤2d<w. The 3D (w)-form then satisfies equation (1).

<Translation of Neighborhoods>

Figure 4:
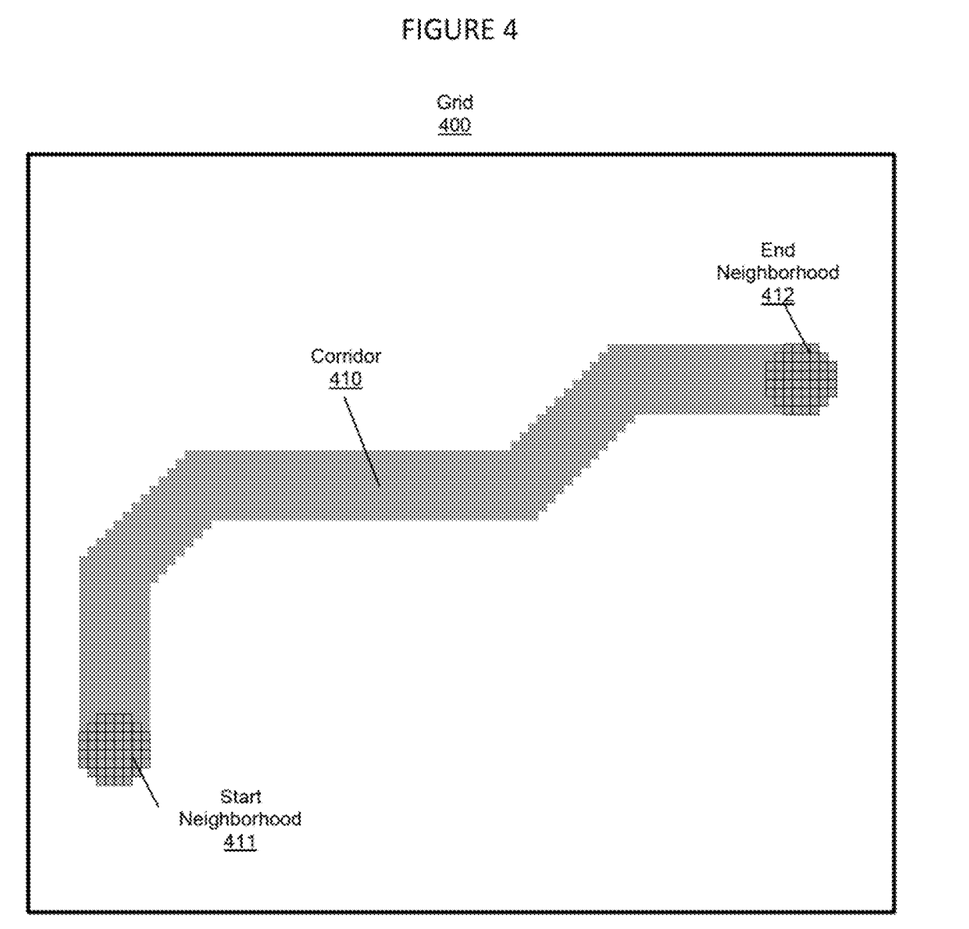
FIG. 4 is a corridor in a rectangular grid obtained according to an embodiment.

A corridor results from translating a neighborhood having the predetermined cell arrangement, from a start neighborhood to an end neighborhood (i.e., the corridor's terminus points both also have the predetermined cell arrangement). In fact, the corridor consists of cells swept during a sequence of straight-line translations as illustrated in FIG. 4 (where 410 is the corridor represented in gray through grid 400, between start neighborhood 411 and end neighborhood 412).

Figure 5:
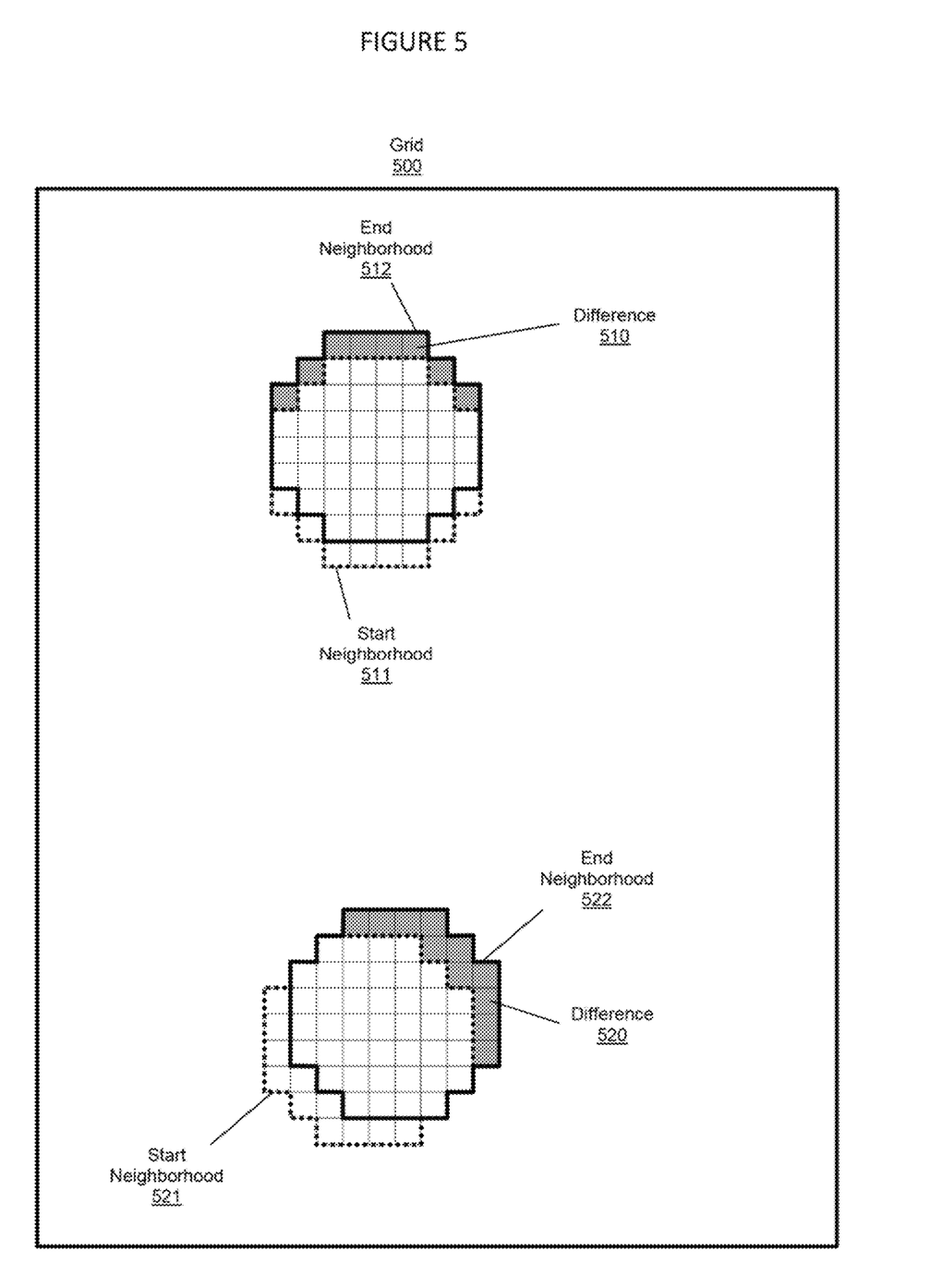
FIG. 5 illustrates one-step cell translations in a rectangular grid.

The translation cost associated with a straight-line translation is determined using locations and values of cells swept during the translation. A default formula or a formula specified by a user may be used. One-cell-step translations illustrated in FIG. 5 are particular cases of straight-line translations (the shortest segments possible). A first one-cell-step translation is a vertical one-cell shift from a first neighborhood 511 (with dashed lines edges) to a second neighborhood 512. A second one-cell-step translation is a diagonal one-cell shift from a third neighborhood 521 (with dashed lines edges) to a fourth neighborhood 522.

In one embodiment, the translation costs for such one-cell-step translations are determined by the values in the cells (e.g., 510 and 520 emphasizes with gray) that belong to end neighborhoods 512 and 522, but not to start neighborhoods 511 and 521, respectively. Note that the translation cost from 512 to 511 is likely different than the translation cost from 511 to 512 as other cells are newly swept in the reverse-direction translation. In one embodiment, the values of the newly swept cells may be added to obtain the translation cost. Plural one-cell-step translations in a same direction (e.g., vertical, horizontal, diagonal, etc.) form a straight-line translation. However, straight-line translations are not limited to chained one-cell-step translations. The translations may be characterized by other directions besides the orthogonal and diagonal ones.

<Generating Graphs Representing the Translations>

A graph is then built to ease solving the least-cost corridor problem. Each node (sometimes called a "vertex") of the graph represents a neighborhood with the predetermined cell arrangement. An edge from a first node to a second node indicates a straight-line translation from a neighborhood corresponding to the first node to a neighborhood corresponding to the second node. The edge is weighed according to a cost incurred by the translation.

Existing algorithms (e.g., Dijkstra's algorithm or any available variant of it, e.g., an variant with a Fibonacci heap or a variant with A* heuristic, if the problem is considered with a grid of cells, each having a value, which causes no neighborhood-to-neighborhood translation to have a negative weight) allow finding a lowest cost through the graph, from an initial node representing a start neighborhood to a terminus node representing an end neighborhood. The corridor then is a reunion of the cells swept during the translations corresponding to the edges whose associated translation costs contribute to this lowest cost.

Up to this point, the start and end neighborhoods were considered uniquely defined. However, the start neighborhood's location may not be completely specified, but only known to be, included in a start zone of cells. For example, looking back to FIGS. 2 and 3, it may be known that the start neighborhood has the cell arrangement 341 and it is included in the upper left corner in FIG. 2 (whose cells are emphasized in gray). Alternatively or additionally, the end neighborhood's location may not be completely specified, but only known to be included in an end zone of cells. For example, the end neighborhood, which also has the cell arrangement 341, may be included in the bottom right corner (whose cells are also emphasized in gray).

Some embodiments are configured to select one or more neighborhoods as terminuses (i.e., start or end neighborhood candidates) according to one or more selection criteria of various types. The selection criteria may be set by default and/or specified by a user.

The selection criteria may be related to topological properties and/or relationships. For example, the terminus must include two specific cells. In another example, the terminus must include at least one cell of a group. Terminuses selection may additionally or alternatively relate to geometric properties and/or relations. For example, a terminus must be within a predetermined distance from a specified feature (group of cells). In another example, the terminus must be in a predetermined range of directions from a specified target. Additionally or alternatively, terminuses selection may be related to geographic properties and/or relations. For example, the terminus must be within a required travel time from a chosen location. In another example, the terminus must be visible from a particular landmark.

In one embodiment, a user may be enabled to generate a map representing distances from (or to) one or more locations of interest, with each distance being measured in terms of the cost of the corresponding least-cost corridor, rather than to draw the corridor per se.

In an illustrative example, there are four sets of terminuses, referred to as a "from-one set," a "from-all set," a "to-one set," and a "to-all set." A user may want:

1) to generate a least-cost corridor from every terminus in the from-all set to every terminus on the to-all set,
2) to select first one terminus from the from-one set and second one terminus from the to-one set so that the cost of a least-cost corridor from the first terminus to the second terminus is less than or equal to the cost of any corridor from any terminus in the from-one set to any terminus in the to-one set and generates a least-cost corridor from the first terminus to the second terminus,
3) for first each terminus in the from-all set to select a second one terminus from the to one set so that the cost of a least-cost corridor from the first terminus to the second terminus is less than or equal to the cost of any corridor from the first terminus to any terminus in the to-one set and to generate a corridor from the first terminus to the second terminus, and
4) for first each terminus in the to-all set to select a second one terminus from the from-one set so that the cost of a least-cost corridor from the second terminus to the first terminus is less than or equal to the cost of any corridor from any terminus in the from-one to the first terminus and generate a corridor from the second terminus to the first terminus.

A graphical interface that facilitates user interaction for implementing the above-described terminus selection is described hereinafter. When a user clicks on a first graphic feature laid over a raster layer representing cost and selects an item labeled "contained by" from a first menu, all the neighborhoods contained by the first graphic feature are automatically selected as terminuses. When the user selects an item labeled "from one" from a second menu, the selected terminuses are automatically put into a from-one set. When the user clicks on a second graphic feature laid over the cost raster layer and selects an item labeled "intersect" from the first menu, all the neighborhoods intersecting the second graphic feature are automatically selected as terminuses. When the user selects an item labeled "to one" from the second menu, the selected terminuses are automatically put into a to-one set. The user selecting an item labeled "generate corridor" from a third menu initiates searching for a cost corridor from a terminus in the from-one set to a terminus in the to-one set whose cost is less than or equal to the cost of any corridor from any terminus in the from-one set to any terminus in the to-one set.

Another embodiment of a graphical interface is described hereinafter. When a user clicks on a plurality of graphic features laid over a cost raster layer with the shift key down, selects an item labeled "visible from" from a first menu, and selects a raster layer representing topographic elevation from a list box, all the neighborhoods visible from any of the selected graphic features over the terrain inferred by the topographic elevation raster layer are automatically selected as terminuses. When the user selects an item labeled "to one" from a second menu, the selected terminuses are automatically put into a to-one set. The user selecting an item labeled "generate a cost distance map" from a third menu initiates searching, for each neighborhood in the grid, for a least-cost corridor from that neighborhood to a terminus in the to-one set such that its cost is less than or equal to the cost of any corridor from that neighborhood to any terminus in the to-one set, and generating a raster layer on which each cell is assigned the minimum of the costs of those least-cost corridors each from any neighborhood containing that cell to any terminus in the to-one set.

Figure 6:
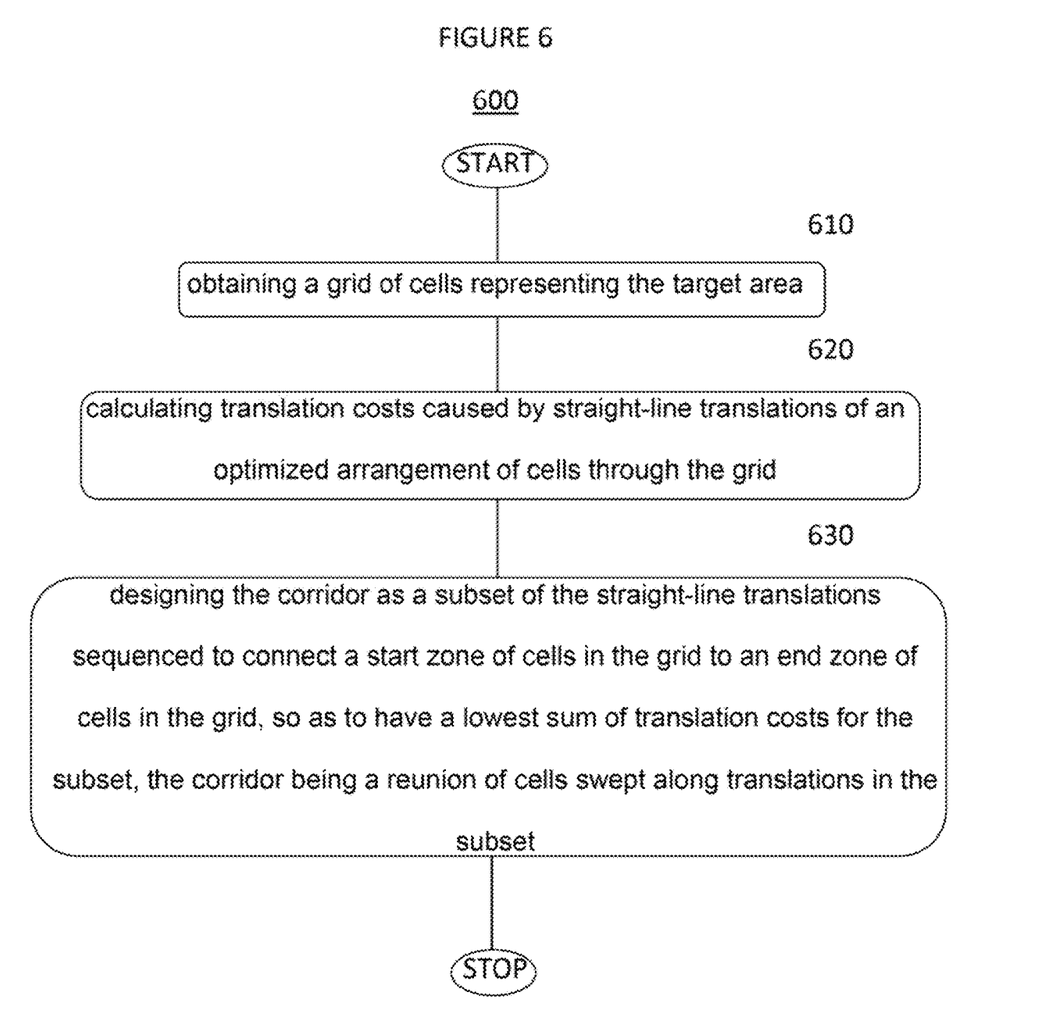
FIG. 6 is a flowchart of a method according to an embodiment.

FIG. 6 is a flowchart of a method 600 according to an embodiment. Method 600 is performed for designing a corridor for conserving a wildlife habitat or building a road or a pipeline in a target area so as to minimize an environmental, economic, behavioral or any other cost caused by implementing the corridor. The method includes obtaining a grid of cells with values representing the target area at 610. Each cell has a value associated corresponding to a cost impact triggered by including the cell in the corridor.

Method 600 further includes calculating translation costs caused by straight-line translations of an optimized arrangement of cells through the grid, wherein each of the translation costs is determined using locations and values of cells swept during a respective one of the straight-line translation, and the optimized arrangement is characterized by a reduced variation of translation width with a translation direction at 610. The optimized arrangement is characterized by a reduced variation of translation width with a translation direction (e.g., the ones illustrated in FIG. 3).

Method 600 further includes designing the corridor as a subset of the straight-line translations sequenced to connect a start zone of cells in the grid to an end zone of cells in the grid, so as to have a lowest sum of translation costs for the subset at 630. The corridor is a reunion of all cells that are swept during translations in the subset.

In one embodiment, the grid of cells, is a square-cell grid and the optimized arrangement covers cells of an equal number, w, of rows and columns, and has a number, d, of diagonal rows of cells removed from every corner, wherein 2d<w. In another embodiment, the grid is made of three-dimensional cubic cells and the optimized arrangement covers cells of an equal number, w, of rows, columns and layers, and has a number, d, of diagonal layers of cells removed from every edge, wherein 2d<w.

In one embodiment, a straight-line translation which is a one-cell-step translation from a first neighborhood to a second neighborhood having the optimized arrangement, then a respective translation cost is a sum of values of cells included in the second neighborhood but not in the first neighborhood.

The method may further include selecting a start neighborhood in the start zone and/or selecting an end neighborhood in the end zone, the start neighborhood and the end neighborhood being made of cells having the optimized arrangement. That means that a first translation of the subset starts from the start neighborhood and a last translation of the subset ends at the end neighborhood. The selection may be performed according to at least one of a topologic, geometric or geographic criterion.

In some embodiments, the method may further include redefining the start zone and/or the end zone, and redesigning the corridor as an updated subset of the straight-line translations sequenced to connect the start zone to the end zone, so as to have an updated lowest sum of translation costs.

Designing the corridor may include building a graph with nodes representing neighborhoods having the optimized arrangement. An edge from a first node to a second node of the graph indicates that a second neighborhood represented by the second node is a straight-line translation of a first neighborhood represented by the first node. The edge is associated with a translation cost of the respective straight-line translation. The corridor is designed using a lowest edge values sum between nodes in the start zone and nodes in the end zone identified in the graph.

Designing the corridor may also include generating a map representing lowest sums of translation costs from the start zone to possible grid locations of a neighborhood having the optimized arrangement. The corridor is then selected to have lowest cost for a neighborhood in the end zone.

The method may further include displaying at least a part of the grid of cells including the designed corridor (e.g., as in FIG. 4). Alternatively or additionally information characterizing the corridor (e.g., overall cost, cost/lengthy cost/ average width, cost/w, etc.) may be displayed.

In one embodiment, the value(s) in one or more cells may be updated. Alternatively or additionally another optimized arrangement may be selected for designing the corridor. In view of such changes, previously calculated translation costs are re-calculated and the corridor is redesigned as a new subset of the straight-line translations sequenced to connect the start zone to the end zone, so as to have a new lowest sum of translation costs for the new subset.

Optimization or constraints may be taken into consideration when the corridor is designed. The design constraints may include any of the topologic, geometric or geographic criterion already described applied for intermediary positions. Other design constraints may include a minimum cell length of a straight-line transition, a maximum number of direction changes, etc. For example, referring back to FIG. 2, a constraint may require the corridor cells not to include cells adjacent to the black cells.

Additionally or alternatively, a post-design optimization may be applied to meet an additional objective (e.g., avoiding cells with specified undesirable attributes or locations) and/or to comply with an additional constraint (e.g., similar to the above-listed design constraints). The modifications may be limited by a maximum allowable increase of the cost.

The apparatus of FIG. 1 may be configured to execute any of the above-described methods. Interface 130 is thus configured to exchange data and/or commands related to corridor design. Data processing unit 120 is configured to obtain the grid of cell s with their corresponding values, to calculate the translation costs as described above, and to design the corridor as a subset of the straight-line translations sequenced to connect a start zone of cells in the grid to an end zone of cells in the grid, so as to have a lowest sum of translation costs for the subset. The apparatus may include a display configured to display at least a part of the grid of cells including the designed corridor and/or to display information characterizing the corridor.

The data processing unit and the interface may further be configured to enable selecting a start neighborhood (from which a first translation in the subset starts) in the start zone and/or selecting an end neighborhood (at which a last translation in the subset ends) in the end zone according to at least one of a topologic, geometric or geographic criterion.

In one embodiment, the data processing unit and the interface are further configured to enable at least one of redefining the start zone or the end zone, updating the optimized arrangement and/or changing, at least one value of a cell in the grid, wherein the translation costs are then re-calculated and the corridor is redesigned.

The interface may further be configured to receive user input for modifying at least one value of a cell in the grid of cells, and/or for updating the same predetermined arrangement. The data processing unit is then further configured to recalculate the translation costs and to redesign the corridor.

Data processing unit may also be configured to perform a post-design optimization of the corridor, alternatively or additionally to taking into consideration one or more constraint when designing the corridor.

The data storage unit 110 in FIG. 1 stores executable codes (112) which when executed by a computer make the computer perform a method for designing a corridor for conserving a wildlife habitat or building a road or a pipeline in a target area so as to minimize an environmental, economic, behavioral or any other cost caused by implementing the corridor (e.g., method 600 or other above-described embodiments).

The disclosed exemplary embodiments provide an apparatus and a method for raster data processing aiming to find a lowest-cost corridor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for designing a corridor for conserving a wildlife habitat or building a road or a pipeline in a target area, so as to minimize an environmental, economic, behavioral or any other cost caused by implementing the corridor, the method comprising:
- obtaining a grid of cells representing the target area, with each cell having associated a value corresponding to a cost impact triggered by including the cell in the corridor;
- generating an optimized arrangement of cells to reduce variation of translation width with a translation direction through the grid;
- calculating translation costs caused by straight-line translations of the optimized arrangement of cells through the grid, wherein each of the translation costs is determined using locations and values of cells swept during a respective one of the straight-line translation; and
- designing the corridor as a subset of the straight-line translations sequenced to connect a start zone of cells in the grid to an end zone of cells in the grid, so as to have a lowest sum of translation costs for the subset, wherein the corridor is a reunion of cells swept along translations in the subset.

2. The method of claim 1, wherein the grid of cells is made of two-dimensional square cells and the optimized arrangement covers cells of an equal number, w, of rows and columns, and has a number, d, of diagonal rows of cells removed from every corner, wherein 2d<w.

3. The method of claim 1, wherein the grid is made of three-dimensional cubic cells and the optimized arrangement covers cells of an equal number, w, of rows, columns and layers, and has a number, d, of diagonal layers of cells removed from every edge, wherein 2d<w.

4. The method of claim 1, further comprising:
selecting a start neighborhood in the start zone and/or selecting an end neighborhood in the end zone, the start neighborhood and the end neighborhood being made of cells having the optimized arrangement, wherein
- a first translation of the subset starts from the start neighborhood and a last translation of the subset ends at the end neighborhood, and
- the start neighborhood and the end neighborhood are selected according to at least one of a topologic, geometric or geographic criterion.

5. The method of claim 1, further comprising:
redefining the start zone and/or the end zone; and
redesigning the corridor as an updated subset of the straight-line translations sequenced to connect the start zone to the end zone, so as to have an updated lowest sum of translation costs.

6. The method of claim 1, wherein the designing includes:
building a graph wherein
- each node of the graph represents a neighborhood in the grid having the optimized arrangement, and
- an edge from any first node to any second node indicates that a second neighborhood represented by the second node is a straight-line translation of a first neighborhood represented by the first node, the edge being associated with a translation cost of the respective straight-line translation, and
identifying a lowest edge values sum between nodes in the start zone and nodes in the end zone.

7. The method of claim 1, wherein the designing includes generating a map representing lowest sums of translation costs from the start zone to possible grid locations of a neighborhood having the optimized arrangement.

8. The method of claim 1, further comprising:
displaying at least a part of the grid of cells including the designed corridor; and/or
displaying information characterizing the corridor.

9. The method of claim 1, further comprising:
receiving input for modifying at least one value of a cell in the grid of cells, and/or for updating the optimized arrangement;
re-calculating the translation costs; and
redesigning the corridor as a new subset of the straight-line translations sequenced to connect the start zone to the end zone, so as to have a new lowest sum of translation costs for the new subset.

10. The method of claim 1, wherein the designing of the corridor is performed to comply with at least one design constraint.

11. The method of claim 1, wherein the corridor is then optimized to meet at least one additional objective and/or comply with at least one additional constraint.

12. An apparatus for designing a corridor for conserving a wildlife habitat or building a road or a pipeline in a target area so that to trigger a minimal environmental, economic, behavioral or any other cost, the apparatus comprising:
- an interface configured to exchange data and/or commands related to the designing of the corridor;
- one or more processors connected to the interface and configured
  - to obtain a grid of cells representing the target area, with each cell having associated a value corresponding to a cost impact triggered by including the cell in the corridor,
  - to generate an optimized arrangement of cells to reduce variation of translation width with a translation direction through the grid,
  - to calculate translation costs caused by straight-line translations of the optimized arrangement of cells through the grid, wherein each of the translation costs is determined using locations and values of cells swept during a respective one of the straight-line translation, and
  - to design the corridor as a subset of the straight-line translations sequenced to connect a start zone of cells in the grid to an end zone of cells in the grid, so as to have a lowest sum of translation costs for the subset, wherein the corridor is a reunion of cells swept along translations in the subset; and
- a display configured to display at least a part of the grid of cells including the designed corridor, and/or to display information characterizing the corridor.

13. The apparatus of claim 12, wherein the grid of cells is a made of two-dimensional square cells and the optimized arrangement covers cells of an equal number, w, of rows and columns, and has a number, d, of diagonal rows of cells removed from every corner, wherein 2d<w.

14. The apparatus of claim 12, wherein the one or more processors and the interface are further configured to enable selecting a start neighborhood in the start zone and/or selecting an end neighborhood in the end zone, the start neighborhood and the end neighborhood being made of cells having the optimized arrangement,
wherein
- a first translation of the subset starts from the start neighborhood and a last translation of the subset ends at the end neighborhood, and
- the start neighborhood and the end neighborhood are selected according to at least one of a topologic, geometric or geographic criterion.

15. The apparatus of claim 12, wherein the one or more processors and the interface are further configured to enable at least one of redefining the start zone or the end zone, updating the optimized arrangement, and modifying at least one value of a cell in the grid of cells, wherein the translation costs are then re-calculated and the corridor is redesigned.

16. The apparatus of claim 12, wherein the one or more processors and the interface are further configured to enable optimizing the corridor to meet at least one additional objective and/or comply with at least one additional constraint.

17. The apparatus of claim 12, wherein the one or more processors are configured to generate a graph or a map for designing the corridor,
   wherein each node of the graph represents a neighborhood in the grid having the optimized arrangement, and an edge from any first node to any second node indicates that a second neighborhood represented by the second node is a straight-line translation of a first neighborhood represented by the first node, the edge being associated with a translation cost of the respective straight-line translation, the corridor being identified based on a lowest edge values sum between nodes in the start zone and nodes in the end zone, and
   the map representing lowest sums of translation costs from the start zone to possible grid locations of a neighborhood having the optimized arrangement.

18. A non-transitory computer-readable recording medium storing executable codes which when executed by a computer make the computer perform a method for designing a corridor for conserving a wildlife habitat or building a road or a pipeline in a target area, so as to minimize an environmental, economic, behavioral or any other cost caused by implementing the corridor, the method comprising:
   obtaining a grid of cells representing the target area, with each cell having associated a value corresponding to a cost impact triggered by including the cell in the corridor;
   generating an optimized arrangement of cells to reduce variation of a translation width with a translation direction through the grid;
   calculating translation costs caused by straight-line translations of the optimized arrangement of cells through the grid, wherein each of the translation costs is determined using locations and values of cells swept during a respective one of the straight-line translation; and
   designing the corridor as a subset of the straight-line translations sequenced to connect a start zone of cells in the grid to an end zone of cells in the grid, so as to have a lowest sum of translation costs for the subset, wherein the corridor is a reunion of cells swept along translations in the subset.

\* \* \* \* \*